United States Patent
Hwang et al.

(10) Patent No.: US 7,762,149 B2
(45) Date of Patent: Jul. 27, 2010

(54) PASSENGER DISCRIMINATING APPARATUS EMPLOYING TWO LOAD SENSORS

(75) Inventors: Jae Ho Hwang, Gyeonggi-do (KR); Byeong Yeol Kim, Gyeonggi-do (KR)

(73) Assignee: Hyundai Mobis Co., Ltd., Gyeonggi-do (KR)

(*) Notice: Subject to any disclaimer, the term of this patent is extended or adjusted under 35 U.S.C. 154(b) by 193 days.

(21) Appl. No.: 12/038,306

(22) Filed: Feb. 27, 2008

(65) Prior Publication Data

US 2009/0151477 A1 Jun. 18, 2009

(30) Foreign Application Priority Data

Dec. 17, 2007 (KR) ...................... 10-2007-0132761

(51) Int. Cl.
*G01L 1/00* (2006.01)
(52) U.S. Cl. ................................ 73/862.391
(58) Field of Classification Search ............ 73/862.381, 73/862.391, 862.041, 862.042, 862.043, 73/862.044, 862.045, 862.53
See application file for complete search history.

(56) References Cited

U.S. PATENT DOCUMENTS

| | | | |
|---|---|---|---|
| 6,546,817 B1 * | 4/2003 | Aoki ..................... | 73/862.474 |
| 6,817,254 B2 * | 11/2004 | Aoki ..................... | 73/862.474 |
| 6,843,501 B1 | 1/2005 | Koh | |
| 6,857,654 B2 | 2/2005 | Choi et al. | |
| 6,935,653 B2 | 8/2005 | Koh | |
| 6,955,240 B2 | 10/2005 | Ahn et al. | |
| 7,024,295 B2 * | 4/2006 | Oestreicher et al. ........... | 701/45 |
| 7,052,036 B2 | 5/2006 | Lee et al. | |
| 7,055,365 B2 * | 6/2006 | Yanagi ..................... | 73/1.13 |
| 2002/0104367 A1 * | 8/2002 | Lich et al. .................. | 73/1.13 |
| 2003/0051564 A1 * | 3/2003 | Aoki ..................... | 73/862.391 |
| 2004/0124018 A1 * | 7/2004 | Yanagi ..................... | 177/144 |
| 2008/0178689 A1 * | 7/2008 | Plocher et al. .......... | 73/862.541 |
| 2009/0071265 A1 * | 3/2009 | Hwang et al. ............. | 73/862.53 |

\* cited by examiner

*Primary Examiner*—Eric S McCall
(74) *Attorney, Agent, or Firm*—Greenblum & Bernstein, P.L.C.

(57) ABSTRACT

A passenger discriminating apparatus according to the present invention includes a plurality of load sensors for measuring a load of a passenger, which is applied to a passenger seat disposed within a vehicle, and a pair of dummy sensors configured to support the load of the passenger seat and not having a load sensing function. The type of the passenger is discriminated by comparing a sum of values in which the load values measured by the plurality of load sensors, respectively, are multiplied by a load weight of the load sensors and a reference value. Accordingly, the passenger discriminating apparatus can save the prime cost, reduce its weight, and secure an equivalent or more performance.

11 Claims, 5 Drawing Sheets

PASSENGER DISCRIMINATING APPARATUS
EMPLOYING TWO LOAD SENSORS

This Nonprovisional application claims priority under 35 U.S.C. §119(a) on Patent Application No. 10-2007-0132761 filed in Korea on Dec. 17, 2007, the entire contents of which are hereby incorporated by reference.

BACKGROUND OF THE INVENTION

1. Field of the Invention

The present invention relates to a passenger discriminating apparatus, and more particularly, to a passenger discriminating apparatus for deciding whether an airbag has to be deployed and a degree in which the airbag is deployed according to the type of an occupant on a vehicle seat when the vehicle collides.

2. Discussion of Related Art

An airbag device is adapted to protect passengers within a vehicle by absorbing physical shock occurring when the vehicle collides by employing the elasticity of an airbag cushion portion. This airbag device can be classified into a driver's seat airbag device, a passenger seat airbag device, a side airbag device, and so on.

As the gas is introduced to the airbag cushion portion when the vehicle collides, the airbag cushion portion is deployed at high speed in order to protect the passengers. At this time, an infant or a person who has a small body weight can be injured by shock caused by the deployment of the airbag cushion portion. It is therefore necessary to decide whether to deploy the airbag cushion portion by taking the weight of a passenger into consideration. In this connection, in the North American region, additional criteria for limiting the deployment of the airbag cushion portion according to the weight of an occupant on a vehicle seat, which is measured under various conditions, has been legalized. Accordingly, airbag device manufacturers must be ready for means capable of fulfilling these criteria in order to improve the performance of their airbag devices and export them to the North American region.

To this end, in the prior art, four or more load sensors are installed at the vehicle seat in order to measure the weight of an occupant on the vehicle seat according to a seating state of the occupant, compare the sum of weights measured in the four load sensors with a reference value, and decide whether to deploy an airbag cushion portion based on the comparison result. However, if the number of the load sensors is increased, there are problems in that the price of a passenger discriminating apparatus rises and the price competitiveness is lowered. Although an attempt has been made to solve the problems, the results thereof are insignificant due to the technical difficulties.

SUMMARY OF THE INVENTION

Accordingly, the present invention has been made in view of the above problems occurring in the prior art, and it is an object of the present invention to provide a passenger discriminating apparatus, in which it can minimize error occurring when discriminating passengers and reducing the number of load sensors necessary for the passenger discriminating apparatus by optimizing discrimination margin of the load sensor.

A passenger discriminating apparatus according to the present invention includes a plurality of load sensors for measuring a load of a passenger, which is applied to a passenger seat disposed within a vehicle, and a pair of dummy sensors configured to support the load of the passenger seat and not having a load sensing function. The type of the passenger is discriminated by comparing a sum of values in which the load values measured by the plurality of load sensors, respectively, are multiplied by a load weight of the load sensors and a reference value.

The load weight can be set so that the amount of discrimination margin of a passenger weight becomes a maximum.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE INVENTION

The present invention will now be described in detail in connection with specific embodiments with reference to the accompanying drawings.

Figure 1:
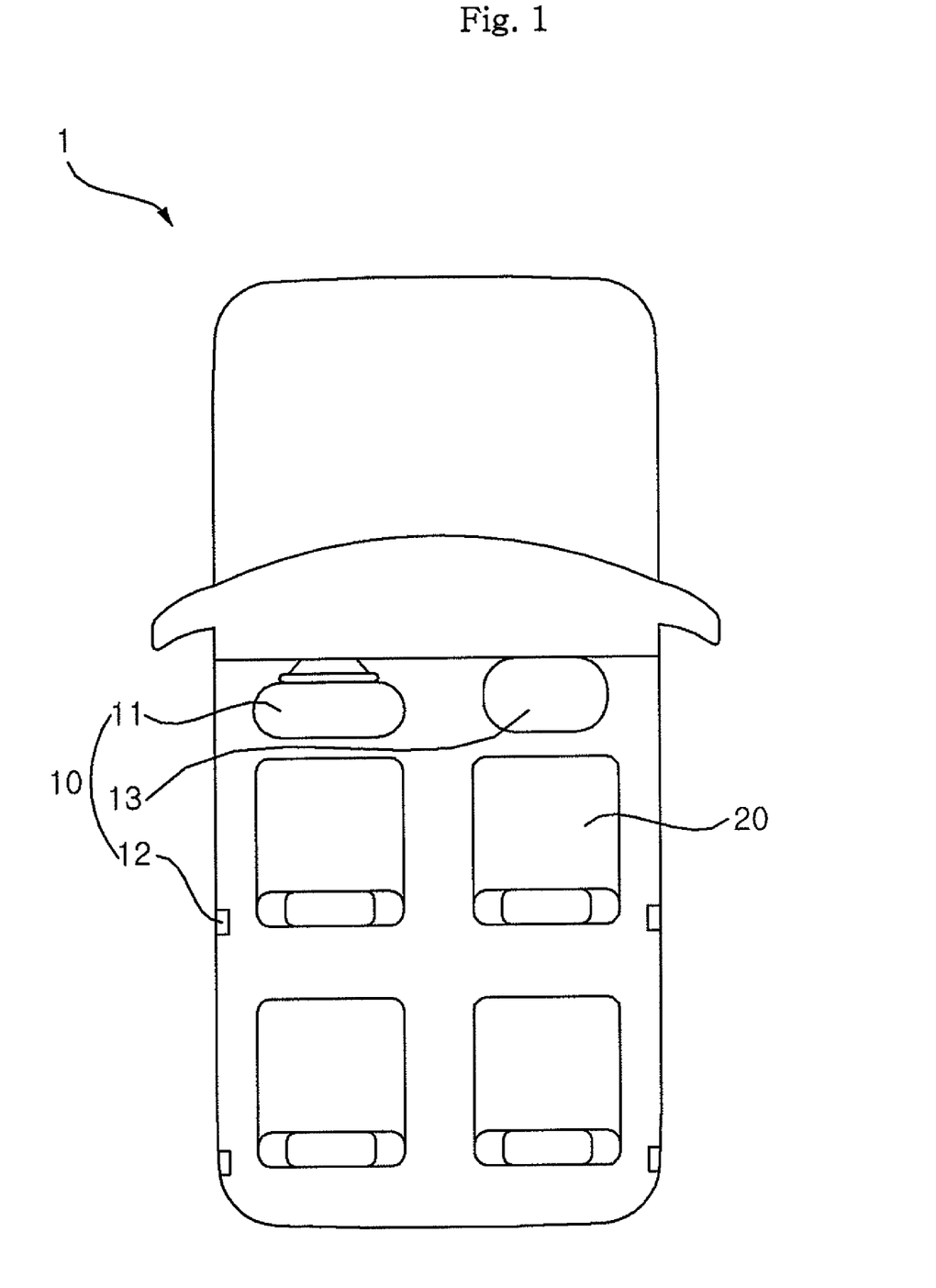
FIG. 1 is a plan view illustrating a passenger seat and an airbag device within a vehicle of the present invention.

FIG. 1 is a plan view illustrating an internal space and an airbag device 10 of a vehicle 1.

Referring to FIG. 1, in order to protect the safety of a passenger from shock occurring when a vehicle collides, a vehicle 1 includes an airbag device 10, and a passenger seat 20 on which a passenger is seated. The airbag device 10 can be classified into a front airbag device (not shown), including a driver's seat airbag device 11 for protecting a driver from injury due to the forward crash of the vehicle and a passenger seat airbag device 13 for protecting an occupant on a passenger seat from injury due to the forward crash of the vehicle, and side airbag devices 12 for protecting passengers from injury due to lateral crash of the vehicle.

In the side airbag device 12, an airbag cushion portion is deployed by employing a gas ejected when an internal gas jet nozzle is exploded when the vehicle collides in order to protect the passengers. If the airbag cushion portion is deployed when the vehicle collides, it is difficult to reuse the airbag cushion portion again. For this reason, the airbag cushion portion must be deployed when it is inevitably necessary. However, if whether to deploy the airbag cushion portion is decided under the condition of vehicle crash only, the airbag cushion portion is deployed, for example, when a passenger is not seated on the passenger seat. Accordingly, there is a possibility that unnecessary cost may occur. It makes it necessary to decide whether to deploy the airbag cushion portion by determining whether a passenger is seated on the seat.

Further, the airbag cushion portion included in the airbag device 10 is deployed at a high speed of about 250 km/h as the gas is sprayed from a gas jet nozzle included therein when the vehicle collides as described above. This is because the airbag cushion portion can play its original role only when it is deployed faster than when a passenger directly collides against structures within the vehicle by means of inertial force, etc., which are generated by the collision of the vehicle. However, since the airbag cushion portion speed is deployed very rapidly, kinetic energy of the airbag cushion portion is relatively great. If the energy generated by the deployment of the airbag cushion portion is transferred to the passenger, the passenger can be injured by the airbag cushion portion. Accordingly, it is not preferable to deploy the airbag whenever the vehicle collides, but is preferable to deploy the airbag in consideration of a speed at which the passenger collides against the vehicle structures when the vehicle collides and a speed at which the airbag cushion portion is deployed.

In addition, these conditions can be accomplished by measuring the load of a passenger who is seated in the passenger seat 20. In other words, when the load of the passenger is less than a certain value, the passenger may be seriously injured by the shock due to the deployment of the airbag cushion portion because a speed at which the passenger is bounded out due to the shock caused by the deployment of the airbag cushion portion. Accordingly, the load of the passenger has to be a criterion for deploying the airbag.

The deployment of the airbag cushion portion is controlled based on a specific criterion. In particular, when the load of the passenger who is seated the passenger seat 20 is less than a certain value, it is necessary to prohibit the deployment of the airbag cushion portion. This criterion has been legalized in a specific country (for example, FMVSS 208—Occupant Crash Protection in the North American region). In the North American region, the import of vehicles that do not pass through the criterion has been prohibited. The criterion was fixed by measuring minimum 30 test items using an adult dummy and minimum 1200 test items using an infant dummy.

Accordingly, in order to guarantee the safety of a passenger and export airbag devices to the North American region, the airbag devices must be designed by measuring the load of the passenger who is seated in the passenger seat 20 under various conditions and comparing measured loads and the above reference value in order to decide whether to deploy the airbag cushion portion. To this end, the vehicle must be equipped with means for determining whether a passenger has been seated in the passenger seat 20, and the load of a seated passenger is an infant or adult.

Figure 2:
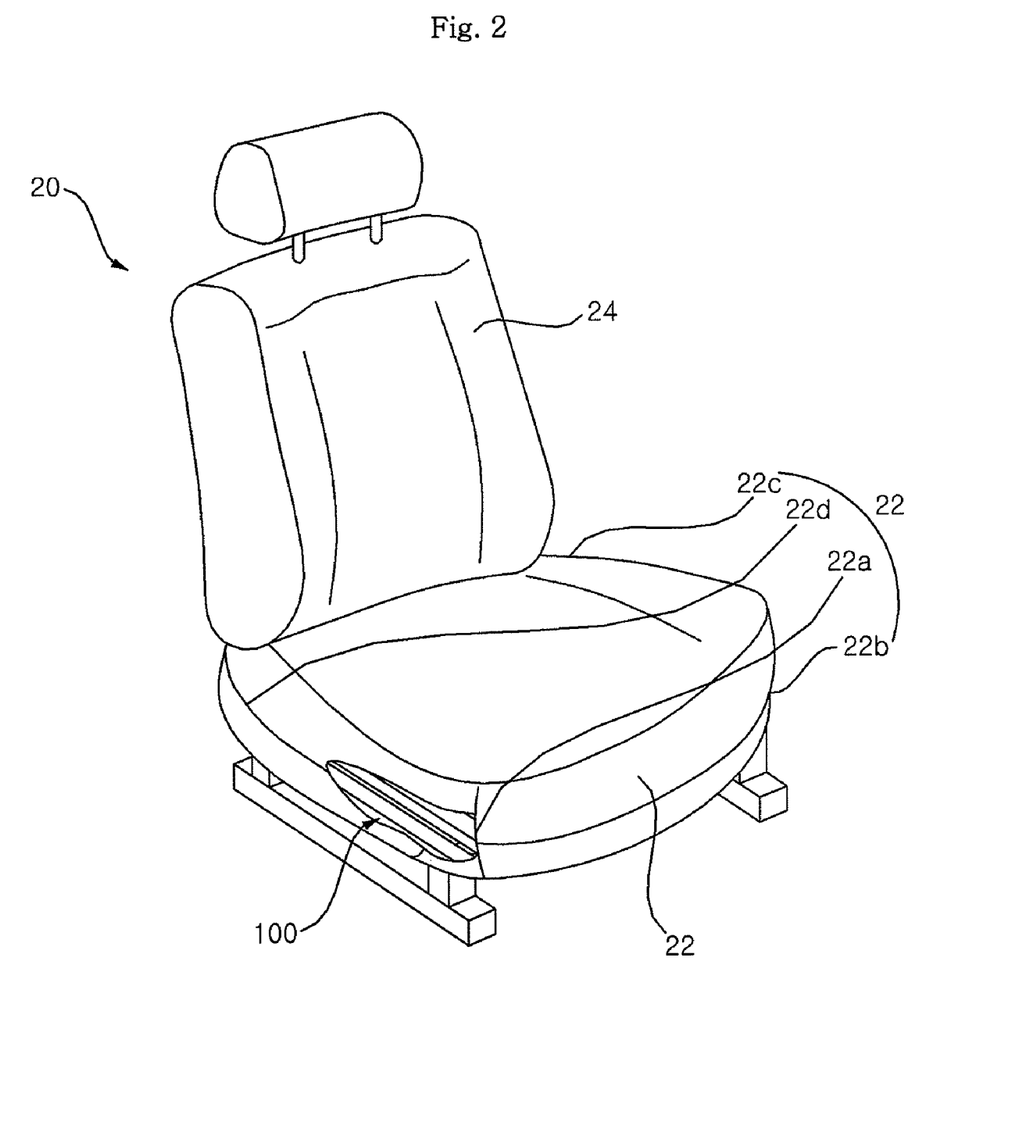
FIG. 2 is a partial cutaway view of the passenger seat shown in FIG. 1.
Figure 3:
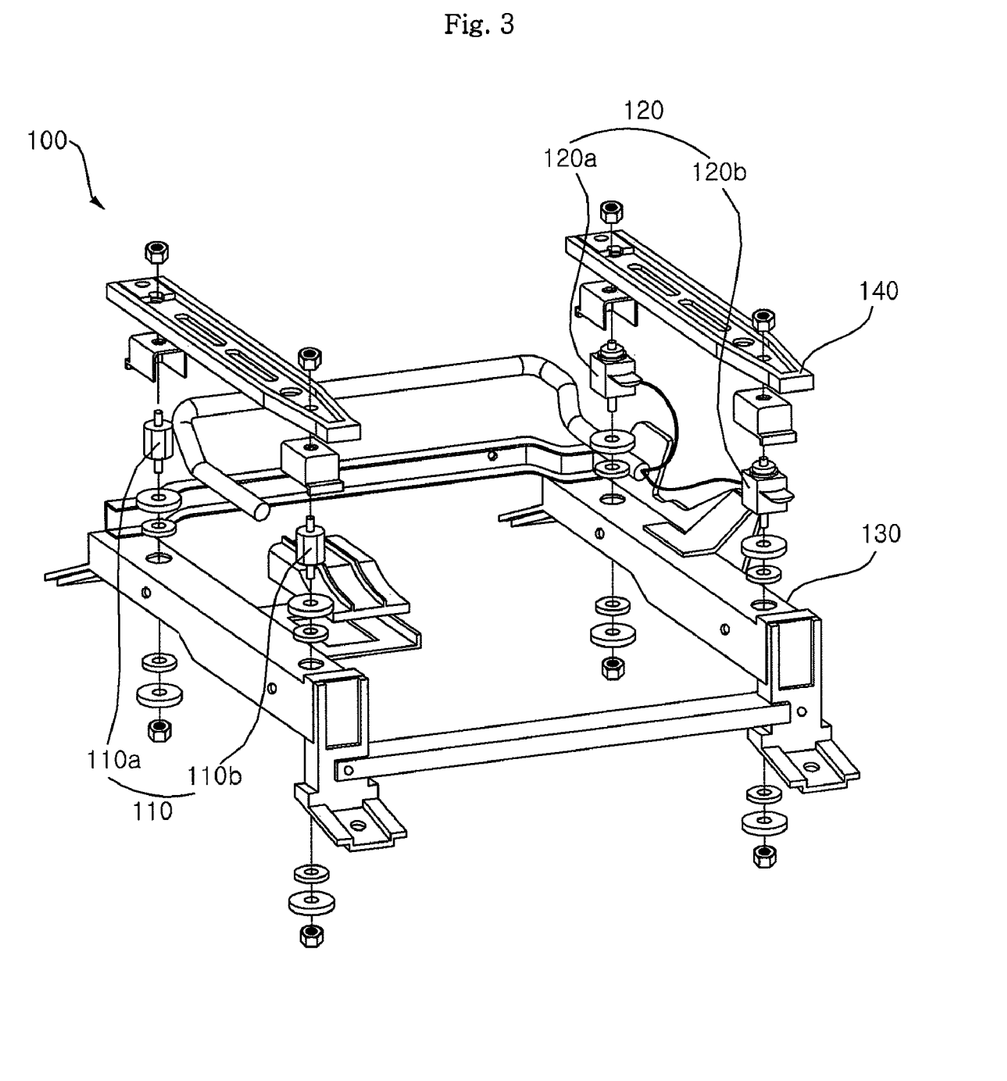
FIG. 3 is a dismantled perspective view of a passenger discriminating apparatus of the passenger seat shown in FIG. 2.

FIG. 2 is a partial cutaway view of the passenger seat 20 shown in FIG. 1. FIG. 3 is a dismantled perspective view of a passenger discriminating apparatus 100 of the passenger seat 20 shown in FIG. 2.

Referring to FIG. 2, the passenger seat 20 may include a seat back 24 for supporting the waist, back, etc. of a passenger who is seated in the passenger seat 20 and a lower portion 22 for supporting the load of the passenger. Though there is a deviation according to the angle of the seat back 24 and a position in which the passenger who is seated in the passenger seat 20, most of the weight of the passenger is supported by the lower portion 22. For this reason, a passenger discriminating apparatus 100 for determining whether a passenger has been seated in the lower portion and discriminating whether the type of the passenger is disposed in the lower portion 22.

Referring to FIG. 3, the lower portion 22 may include a seat (not shown) for distributing the load of a passenger when the passenger is seated in the seat, guide members 140 along which the passenger seat 20 is guided and movable forward and rearward, and base members 130 for supporting the load transferred from the passenger seat 20. The passenger discriminating apparatus 100 is equipped with a plurality of load sensors 120 for measuring the weight of a passenger who is seated in the passenger seat 20. The plurality of load sensors 120 may include a pair of load sensors 120a and 120b. The first and second load sensors 120a and 120b of the load sensors 120 may be disposed on the left or right side of the base member 130. The first and second load sensors 120a and 120b of the load sensors 120 may be disposed at the edge portions of the base member 22 of the passenger seat, more specifically, at corner portions 22a to 22d. It is however to be noted that the position of the load sensor 120 is not limited to the corner portion as shown in FIG. 3. The load sensor 120 may be disposed at various positions according to the shape of the lower portion 22, a state where a passenger is seated, a driving condition, and so on.

Meanwhile, in the present invention, it has been described that the load sensor 120 is disposed at the corner portions 22b and 22c of the corner portions of the lower portion. However, the number of the load sensor 120 need not to be limited to two because the lower portion has been optimized when it has four corner portion as described above.

The passenger discriminating apparatus 100 may further include a pair of dummy sensors 110 supporting a load applied to the passenger seat 20 and not having a load sensing function. Two dummy sensors 110a, 110b are illustrated in FIG. 3. The dummy sensor 110 is adapted to replace the conventional load sensor. It has been made possible by improving the margin of passenger weight discrimination by applying a load weight, which is described later on. However, it is to be understood that the dummy sensor 110 is not an indispensable constituent element in the present invention. The dummy sensor may be omitted, and a structure instead of the dummy sensor may be disposed at the portion from which the dummy sensor 110 is disposed in order to balance the lower portion 22.

The pair of load sensors 120 and the pair of dummy sensors 110 may be disposed between the base member 130 and the guide member 140. Further, the pair of dummy sensors 110 may be disposed corresponding to the pair of load sensors 120. In other words, when the pair of load sensors 120 is disposed on the left side of the base members 130, the pair of dummy sensors 110 may be disposed on the right side of the base members 130. In contrast, when the pair of load sensors 120 is disposed on the right side of the base members 130, the pair of dummy sensors 110 may be disposed on the left side of the base members 130.

The load sensor 120 may include various kinds of load sensors. For example, the load sensor 120 may be implemented by those having ordinary skill in the art using a variety of means for measuring the twist of an elastic material that is twisted according to a pressure applied to the lower portion 22 by a passenger or means for measuring a load of a passenger by sensing a change in the resistance according to the pressure.

The reason why the number of the load sensors can be reduced by substituting part of the load sensors of the passenger discriminating apparatus 100 according to the present invention with the dummy sensors is described below.

If the load sensor 120 is disposed in all the corner portions 22a, 22b, 22c, and 22d of the lower portion 22 of the passenger seat 20, the load sensor 120 measures a weight of the passenger, which is applied to the lower portion 22, and adds the weights to obtain the weight of the passenger. At this time, when various conditions such as whether the passenger has worn the safety belt, the seated position of the passenger and the like are changed, the load of the passenger, which is applied to the lower portion 22, is changed, so the weight value is changed, but the range of the change falls within a certain value. The measured weight value is compared with the reference value specified in the North American standards. As a result of the comparison, when the weight value exceeds the reference value, the passenger is determined as an adult, but when the weight value is less than the reference value, the passenger is determined as an infant or it is determined that the passenger has not been seated in the passenger seat 20.

In this state, if it is determined that the seating passenger is an adult when the vehicle crashes, the airbag cushion portion is deployed and prevent the passenger from colliding against structures within the vehicle by means of inertia. In contrast, if it is determined that the seating passenger is an infant when the vehicle crashes, the airbag cushion portion is not deployed, thus preventing injury occurring due to the deployment of the airbag cushion portion. The discrimination of the passenger may be accompanied by some error. However, the discrimination function of the passenger is most important in the passenger discriminating apparatus 100. It is thus preferred that discrimination margin is controlled greatly so that the passenger can be clearly discriminated near the reference value.

The criterion of the North American standards is very rigid and the discrimination margin must be large enough. In order to maintain its adequate discrimination margin, the plurality of load sensors should be properly disposed in the passenger discriminating apparatus 100. In addition, in the lower portion 22 of a kind in which the four corner portions are disposed as shown in FIG. 2, the load sensors are disposed in all the corner portion 22a, 22b, 22c, and 22d, respectively.

However, in this state, if a pair of the four load sensors is substituted with the dummy sensors, it is difficult to maintain adequate discrimination margin under various conditions according to external parameters such as various seating states of the passenger. Thus, when using the passenger discriminating apparatus for sensing the load of the passenger using a general method, it is impossible to substitute part of the load sensors with the dummy sensors by reducing the number of the load sensors or, in particular, to fulfill the criterion of the North American standards.

In the present invention, however, at least one of the load sensors can be replaced with the dummy sensors based on the concept of a load weight, which is induced as follows.

In the event that the passenger is seated in the passenger seat 20, the reason why the number of the load sensors is not reduced by replacing a par of the load sensors with the dummy sensors is that if the number of the load sensors is reduced, discrimination margin for discriminating the seating passenger using the weight of the passenger as a criterion is reduced and therefore the discrimination performance of the passenger is weakened. Thus, when reducing the number of the load sensors, a sufficient discrimination margin should be secured so that the passenger can be discriminated with only a reduced number of the load sensors. To this end, in allowing the first and second load sensors 22b and 22c to sense the load, load weights $X_1$ and $X_2$ are selected such that the discrimination margin becomes a maximum and the ability to discriminate the passenger as an infant or an adult can be optimized.

The sum of values in which the load weights $X_1$ and $X_2$ are multiplied by load values $S_1$ and $S_2$, respectively, which are measured by the first and second load sensor 120a and 120b included in the passenger discriminating apparatus 100 when the passenger is seated in the passenger seat 20, on the basis of this theoretical base is defined as a passenger weight W. The passenger is discriminated by comparing the weight value W with the reference value. Consequently, the discrimination margin can be optimized. Accordingly, the number of the load sensors can be reduced by applying the passenger discrimination method.

Figure 4:
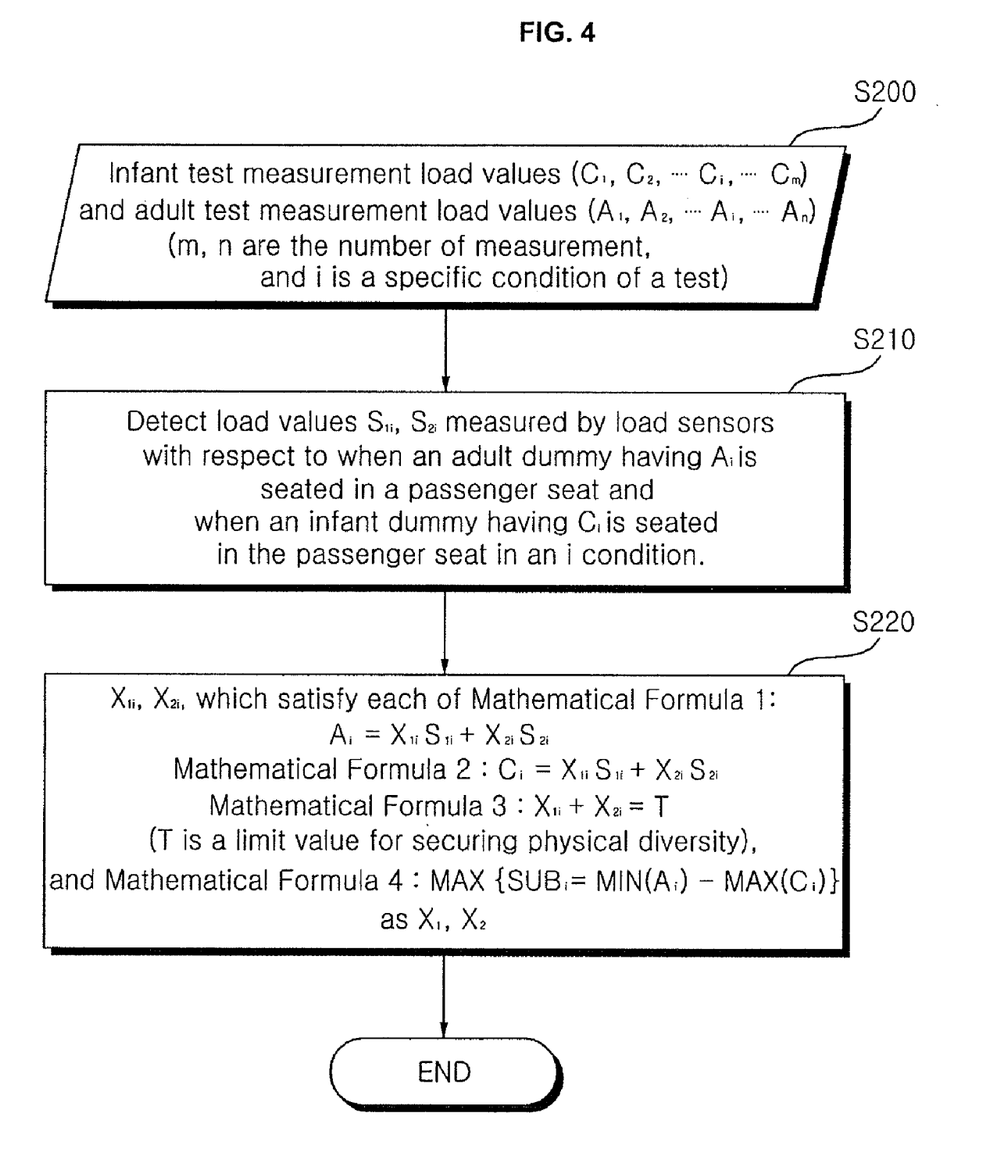
FIG. 4 is a flowchart illustrating a method of determining a load weight of the passenger discriminating apparatus shown in FIG. 3.

FIG. 4 is a flowchart illustrating a method of determining a load weight of the passenger discriminating apparatus 100 shown in FIG. 3.

Referring to FIG. 4, infant test measurement load values $C\_i$, which are measured when an infant dummy (the dummy refers to a doll that is boarded instead of a person in crash experiments) is seated in the passenger seat in a specific condition of a plurality of conditions defined in the North American standards (FMVSS 208) as described above, and adult test measurement load values $A\_i$, which are measured when an adult dummy is seated in the passenger seat in the same condition as the specific condition are collected in step S200.

The adult test measurement load values $A\_i$ and the infant test measurement load values $C\_i$ may be measured several times in the specific condition. Alternatively, the measured load values may be previously measured using the load sensors before the number of the load sensors is reduced. The term "specific condition" may refer to any one of seating states of a passenger defined in the North American standards (for example, a state where a passenger is seated with his legs are twisted, a state where the safety belt is fastened, etc.).

In the specific condition, the adult dummy is seated in the passenger seat 20 equipped with the passenger discriminating apparatus 100 of the present invention and load values $S\_1i$ and $S\_2i$ of the load sensors 120a and 120b are then measured, and the infant dummy is seated in the passenger seat 20 equipped with the passenger discriminating apparatus 100 of the present invention and load values $S\_1i$ and $S\_2i$ of the load sensors 120a and 120b are then measured in step S210.

A load weight is then decided in step S220. The decision of the load weight can be performed as follows. First, a minimum adult test measurement weight value (that is, a minimum value of adult test measurement load values measured when the adult dummy is seated in the passenger seat 20 in the specific condition) and a maximum infant test measurement weight value (that is, a maximum value of infant test measurement load values measured when the infant dummy is seated in the passenger seat 20 in the specific condition) are found. Difference values $SUB\_i$ between the minimum adult test measurement value and the maximum infant test measurement weight value are found in the respective specific conditions.

Then, in a first condition having a maximum value of the difference values $SUB\_i$, the load weight is set so that both a second condition in which a sum of values in which the load values measured by the plurality of the load sensors, respectively, are multiplied by the load weights, respectively, is identical to the adult test measurement weight value when the adult dummy is seated in the passenger seat 20, and a third condition in which a sum of values in which the load values measured by the plurality of the load sensors, respectively, are multiplied by the load weights, respectively, is identical to the infant test measurement weight value when the infant dummy is seated in the passenger seat 20 are satisfied.

At this time, although the number of the load sensor 120 is reduced, the load sensor 120 of the present invention must have the same physical property as that of the load sensor before the number of the load sensor 120 is reduced. Thus, each of the load weights can be decided so that a fourth condition in which the value in which the respective load weights are summed is identical to a specific value. The specific value may be 4 when the number of the load sensors is 4 in the prior art. However, it is to be noted that the value is not limited to 4 or the number of the load sensors.

Meanwhile, as illustrated in an embodiment of the present invention, when the number of the load sensors is 2, load weights X_1 and X_2 can be decided under the following condition. A condition of a test to fulfill [Mathematical Formula 4] is found. In the condition to fulfill [Mathematical Formula 4], load weights X_1$i$ and X_2$i$ to fulfill all of [Mathematical Formula 1], [Mathematical Formula 2], and [Mathematical Formula 3] are selected and then defined as the load weights X_1 and X_2. [Mathematical Formula 1], [Mathematical Formula 2], [Mathematical Formula 3], and [Mathematical Formula 4] can be expressed as follows.

$$A\_i = X\_1i \text{ times } S\_1i + X\_2i \text{ times } S\_2i \quad \text{[Mathematical Formula 1]}$$

A_$i$ is an adult test measurement weight value already measured in a specific condition ($i$), X_$ki$ is a load weight of a $k^{th}$ load sensor in the specific condition ($i$), and S_$ki$ is a load value measured by the $k^{th}$ load sensor when the adult dummy is seated in the passenger seat in the specific condition ($i$).

$$C\_i = X\_1i \text{ times } S\_1i + X\_2i \text{ times } S\_2i \quad \text{[Mathematical Formula 2]}$$

C_$i$ is an infant test measurement weight value already measured in the specific condition ($i$), X_$ki$ is a load weight of a $k^{th}$ load sensor in the specific condition ($i$), and S_$ki$ is the load value measured by the $k^{th}$ load sensor when the infant dummy is seated in the passenger seat in the specific condition ($i$).

$$X\_1i + X\_2i = T \quad \text{[Mathematical Formula 3]}$$

X_$ki$ is the load weight of the $k^{th}$ load sensor in the specific condition ($i$), and T is a specific limit value.

$$\text{MAX}[\text{MIN}(A\_i) - \text{MAX}(C\_i)] \quad \text{[Mathematical Formula 4]}$$

A_$i$ is the adult test measurement weight value already measured in the specific condition ($i$), and C_$i$ is the infant test measurement weight value already measured in the specific condition ($i$).

Discrimination margin of the load sensor is optimized by introducing the load weights decided in this manner. Accordingly, the number of the load sensors can be reduced.

Figure 5:
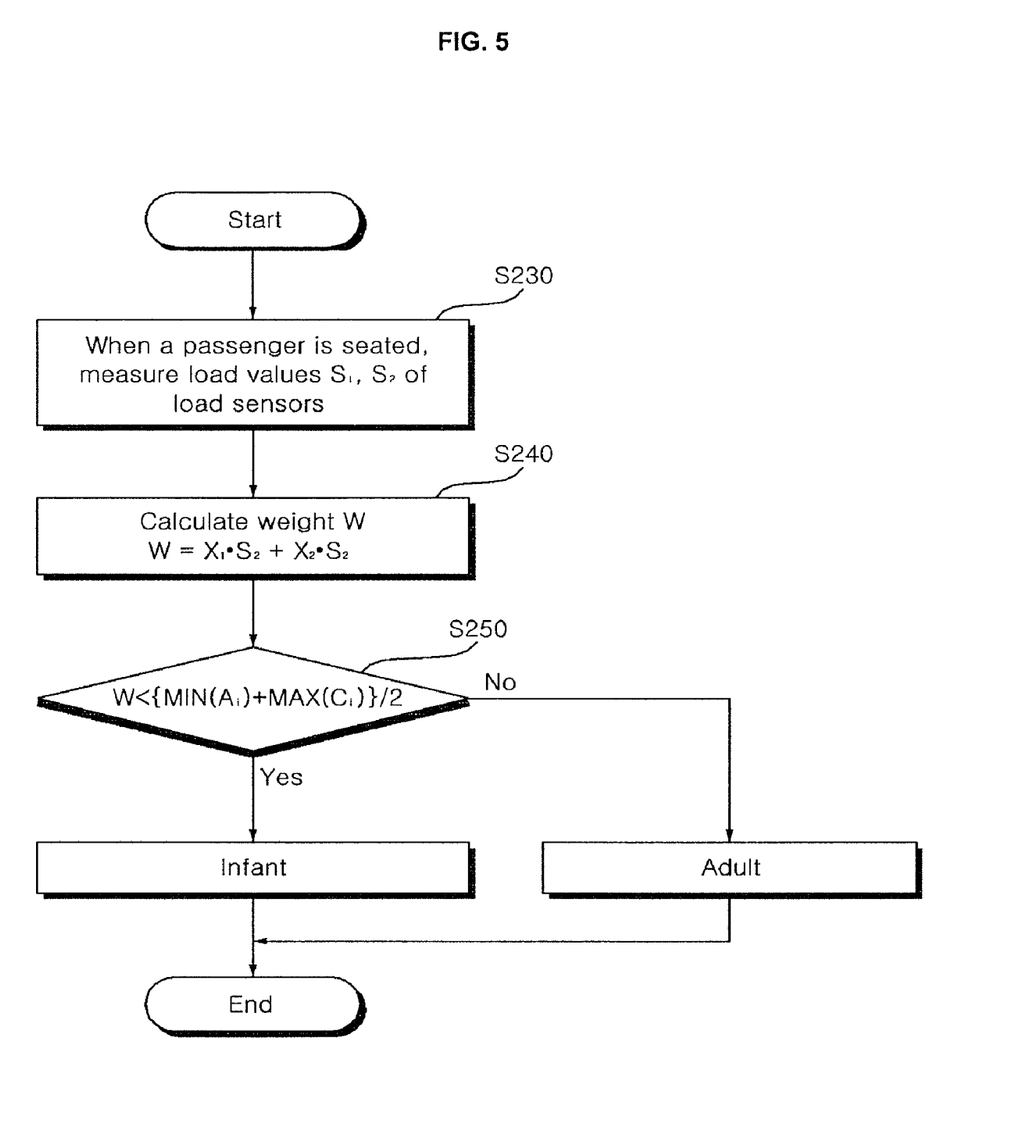
FIG. 5 is a flowchart illustrating a process of discriminating a passenger using the passenger discriminating apparatus shown in FIG. 3.

FIG. 5 is a flowchart illustrating a process of discriminating a passenger using the passenger discriminating apparatus 100 shown in FIG. 3.

Referring to FIG. 5, load values S_1 and S_2 are measured by the load sensors 120$a$ and 120$b$, respectively, when a passenger is seated in the passenger seat 20 in step S230.

The passenger weight W is calculated based on the load values S_1 and S_2 in step S240. The weight W can be induced by the following [Mathematical Formula 5].

$$W = X\_1 \text{ times } S\_1 + X\_2 \text{ times } S\_2 \quad \text{[Mathematical Formula 5]}$$

The weight W is compared with the reference value in order to determine whether the passenger is heavy or not in step S250. The reference value may be an average value of a minimum value of the adult test measurement load values A_$i$ and a maximum value of the infant test measurement load values C_$i$. By deciding the reference value as described above, discrimination margin in a discrimination region of the adult and the infant of the passenger weight W detected by the load sensor can be optimized. However, it is to be noted that the present invention is limited to the above method of deciding the reference value as described above.

As described above, according to the present invention, in accordance with the passenger discriminating apparatus according to the present invention, the number of the load sensors can be reduced and the production cost of the passenger discriminating apparatus ca be saved. Further, when measuring the weight of a passenger seated in a passenger seat, the concept of a load weight is introduced. Accordingly, discrimination margin of a passenger can be improved and therefore reliability of passenger discrimination can be improved. Moreover, since part of the load sensors is replaced with the dummy sensors, the weight of the passenger discriminating apparatus is reduced and product competitiveness can be improved.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A passenger discriminating apparatus, comprising:
a plurality of load sensors that each measure a load value of a passenger seated in a passenger seat disposed within a vehicle; and
a pair of dummy sensors configured to support a load of the passenger seat, the dummy sensors not performing a load sensing function,
wherein the passenger discriminating apparatus discriminates a type of the passenger by multiplying each of the load values by a load weight, summing the products of the load values and the load weights, and comparing the sum to a reference value, and
the load weights are determined so that a difference between a minimum adult test measurement weight value, which is a minimum value of adult test measurement load values measured when an adult dummy is seated in the passenger seat in a specific condition, and a maximum infant test measurement weight value, which is a maximum value of infant test measurement load values measured when an infant dummy is seated in the passenger seat in the specific condition, is maximized.

2. The passenger discriminating apparatus of claim 1, wherein the plurality of load sensors comprise a pair of load sensors.

3. The passenger discriminating apparatus of claim 2, wherein the passenger seat comprises:
guide members along which the passenger seat is guided and can be moved forward and rearward; and
base members that support a load transferred from the passenger seat.

4. The passenger discriminating apparatus of claim 3, wherein:
the pair of load sensors is disposed on a left or right base member, and
the pair of dummy sensors is disposed on a right or left base member at positions corresponding to positions of the pair of load sensors.

5. The passenger discriminating apparatus of claim 3, wherein the pair of load sensors and the pair of dummy sensors are disposed between the guide members and the base members.

6. The passenger discriminating apparatus of claim 3, wherein the pair of load sensors and the pair of dummy sensors are disposed at edge portions of the base members, respectively.

7. The passenger discriminating apparatus of claim 3, wherein the pair of load sensors and the pair of dummy sensors are disposed at corner portions of the base members, respectively.

8. The passenger discriminating apparatus of claim 1, wherein:

the plurality of load sensors comprise two load sensors, and a load weight of each of the two load sensors is decided so that in a specific condition in which the formula MAX [MIN(A_i)−MAX(C_i)] is fulfilled, A_i being an adult test measurement weight value already measured in a specific condition (i), and C_i being an infant test measurement weight value already measured in the specific condition (i), all of the following formulas are fulfilled:

$$A\_i = X\_1i \text{ times } S\_1i + X\_2i \text{ times } S\_2i, \text{ wherein}$$

$X\_ki$ is a load weight of a $k^{th}$ load sensor in the specific condition (i), and $S\_ki$ is a load value measured by the $k^{th}$ load sensor when an adult dummy is seated in the passenger seat in the specific condition (i);

$$C\_i = X\_1i \text{ times } S\_1i + X\_2i \text{ times } S\_2i, \text{ wherein}$$

$X\_ki$ is the load weight of the $k^{th}$ load sensor in the specific condition (i), and $S\_ki$ is a load value measured by the $k^{th}$ load sensor when an infant dummy is seated in the passenger seat in the specific condition (i); and $$X\_1i + X\_2i = T, \text{ wherein}$$

$X\_ki$ is the load weight of the $k^{th}$ load sensor in the specific condition (i), and T is a specific limit value.

9. The passenger discriminating apparatus of claim 1, wherein the load weights are determined such that in a first condition in which the difference between the minimum adult test measurement weight value and the maximum infant test measurement weight value is a maximum value, both a second condition in which the sum of the products of the load values and the load weights is identical to the adult test measurement weight value when the adult dummy is seated in the passenger seat, and a third condition in which the sum of the products of the load values and the load weights is identical to the infant test measurement weight value when the infant dummy is seated in the passenger seat, are satisfied.

10. The passenger discriminating apparatus of claim 9, wherein the load weights are determined so that a sum of the load weights is identical to a specific limit value.

11. A passenger discriminating apparatus, comprising:

a plurality of load sensors that each measure a load value of a passenger seated in a passenger seat disposed within a vehicle; and a pair of dummy sensors configured to support a load of the passenger seat, the dummy sensors not performing a load sensing function, wherein the passenger discriminating apparatus discriminates a type of the passenger by multiplying each of the load values by a load weight, summing the products of the load values and the load weights, and comparing the sum to a reference value, and the reference value is an average of a minimum value of an adult test measurement value that is already measured, and a maximum value of an infant test measurement value that is already measured.

\* \* \* \* \*